United States Patent [19]
Quintilian

[11] 3,800,404
[45] Apr. 2, 1974

[54] PLATE PRODUCTION SYSTEM WITH LOW LEVEL BUNDLING, STACKING, AND TRANSPORT

[75] Inventor: Bartholomew Frank Quintilian, Baltimore, Md.

[73] Assignee: Koppers Company, Inc., Pittsburgh, Pa.

[22] Filed: Dec. 13, 1972

[21] Appl. No.: 314,712

[52] U.S. Cl............... 29/464, 29/33 R, 29/453
[51] Int. Cl.............................. B23q 3/00
[58] Field of Search............ 219/86, 87, 107; 228/6, 228/470, 5; 29/33, 453, 200 R, 200 A, 208 R, 464, 33 R, 33 P

[56] References Cited
UNITED STATES PATENTS

| | | | |
|---|---|---|---|
| 3,708,100 | 1/1973 | Buchfuher et al. | 228/47 |
| 3,557,439 | 1/1971 | Dykeman | 29/200 A |
| 3,646,657 | 3/1972 | Small | 29/200 A |
| 3,729,798 | 5/1973 | Ejlertsen | 29/200 A |
| 3,707,257 | 12/1972 | Wogerbauer et al. | 228/6 |
| 2,506,550 | 5/1950 | Morrison | 29/200 A |
| 3,709,423 | 1/1973 | Hano et al. | 228/6 |

*Primary Examiner*—Richard J. Herbst
*Assistant Examiner*—James R. Duzan
*Attorney, Agent, or Firm*—Boyce C. Dent; Oscar B. Brumback; Olin E. Williams

[57] ABSTRACT

A composite plate production system having at a welding station a combined pressure-assembler, welding clamp, and precision stacker ram-carriage unit, feeding a low-level self loading and unloading shuttle by means of a stacking table located above the shuttle, the shuttle being arranged for conveying and off-loading bundles onto a transfer table having a pivotal edge-angle for stabilizing bundles rotated during hoist pick-up in preparation for edge-down bundle storage.

11 Claims, 4 Drawing Figures

FIG. 3
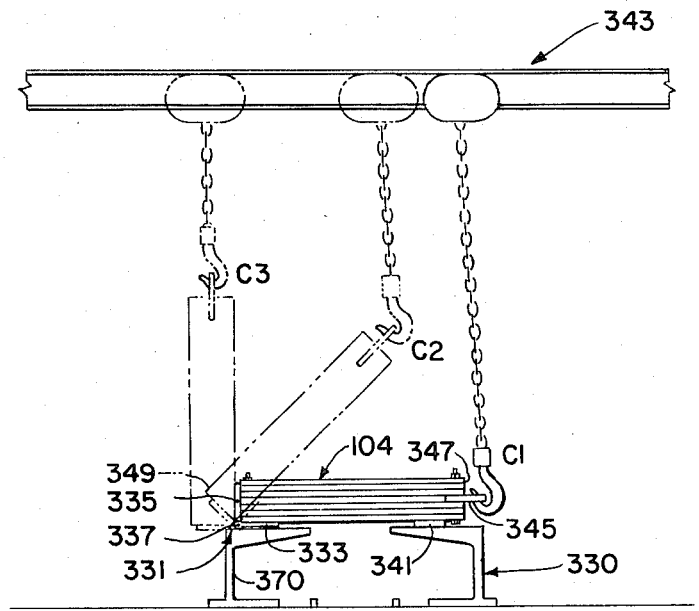
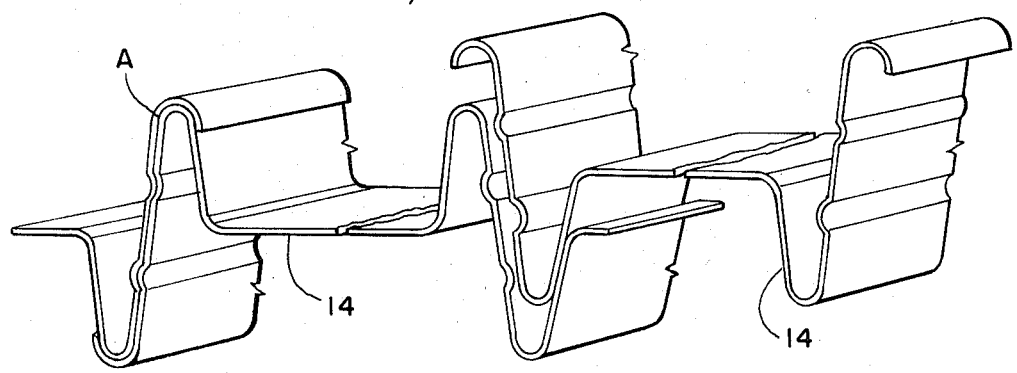
FIG. 4

PLATE PRODUCTION SYSTEM WITH LOW LEVEL BUNDLING, STACKING, AND TRANSPORT

CROSS REFERENCES TO RELATED APPLICATION

Aspects of this invention relate to the disclosure in the co-pending application filed herewith by Bartholomew F. Quintilian, the present inventor, entitled "Precipitator Plate Production System With Low Level Bundling and Transport" and assigned to the Assignee of the present invention.

BACKGROUND OF THE INVENTION

This invention relates generally to production of composite plate structures and to the preparation of such structures for storage and shipping.

DESCRIPTION OF THE PRIOR ART

Collecting electrodes or precipitator plates of the types assembled from roll formed, cut to length modules are disclosed in U.S. Pat. No. 3,418,792, issued on December 31, 1968, to Bartholomew F. Quintilian and Robert J. W. Williams, and entitled "Modular Collector Electrode for Electrostatic Precipitators"

Such precipitator plates have heretofore been assembled by interlocking the joints serially at one station, welding the hempieces across the ends at a second station, individually transferring the assembled precipitator plates by lifting hoist to a bundling and turnover fixture at a third station, and transferring the up-ended bundles of plates by a heavy crane to shipping or other storage areas.

This old-art sequence causes back-ups from the output end which at times limit the roll-forming operation to substantially less than rated capacity. When the heavy or plant-wide crane normally used for moving the bundles shifts temporarily to another job, production stops. While the heavy crane is being coupled to the top of an up-ended bundle on the bundling and turnover fixture (a process done slowly to protect the workman engaging the hook at considerable height above the floor) production stops at the welding station. While stacks of plates on the bundling and turnover fixture are being squared for bundling and are being united into bundles, if any difficulty arises requiring appreciable time to correct, production stops upstream at the welding station. While the hoist operator engages the last plate assembled with the suction cups of the auxiliary hoist normally used for lifting the individual plates, and slowly and carefully lifts it from and clears it past the welding fixture, production stops at the welding station. Each time production stops at the welding station, production stops up the line at the press and the roll former and cut-off, idling workers as well as equipment.

Other obstacles and difficulties encountered in practice of the old art method described include plate warpage caused by cumulative error induced by serial pressure-interlocking of the successive modules, and difficulty in correcting such warpage after the endpieces are welded in place.

The cross referenced co-pending application describes one solution to the above problems in the form of means and method requiring time and capital investment which are modest in terms of the resultant increases in production and product quality and the decreases in worker fatigue hazard and loss through damage.

The present invention discloses a system which solves the problem of the old-art obstacles in production of precipitator plates and the like in a manner considerably more efficient than any previously proposed, which is adapted to produce closer-tolerance products than previous systems, and which is safe and convenient by design, but which requires a somewhat greater capital investment than the system disclosed in the co-pending application.

SUMMARY OF THE INVENTION

A first object of the present invention is to provide precipitator plate production means and method which reduce the number of product manipulations required in the pressure-assembling, welding and stacking operations, insuring better contour and alignment in these crucial stages while greatly increasing sureness and speed of handling;

another object of the present invention is to provide means and method as described which include means for increasing speed and the safety of bundle up-ending for storage;

futher objects of the invention are to provide a system as described which is straightforward, simple, durable, and economical in operation.

In representative embodiment the invention includes a composite plate production system having associated with a welding station an integrated pressure-assembler, welding aligner, and stacker, and a positive-positioning transfer system.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, wherein like parts are marked alike;

FIG. 3 is a diagrammatical elevation of a bundle transfer frame; and

FIG. 4 is an isometric view of a pressure-interlocking array of modules of a type previously invented and representative of a stage of production in the present invention.

DESCRIPTION OF THE PREFERRED EMBODIMENT

Figure 1:
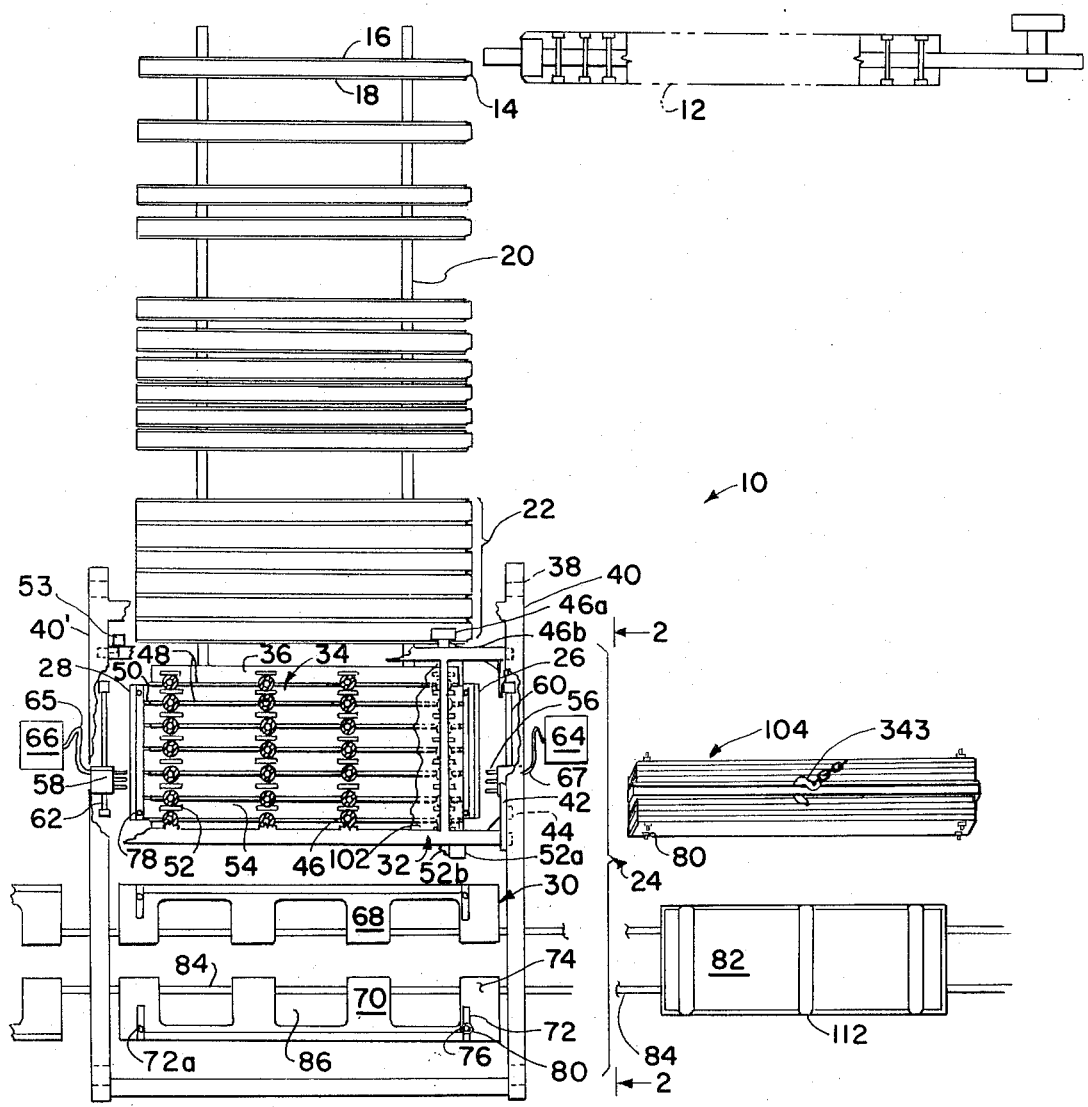
FIG. 1 is a diagrammatical plan view of a production system according to this invention, partially broken away to show details below.
Figure 2:
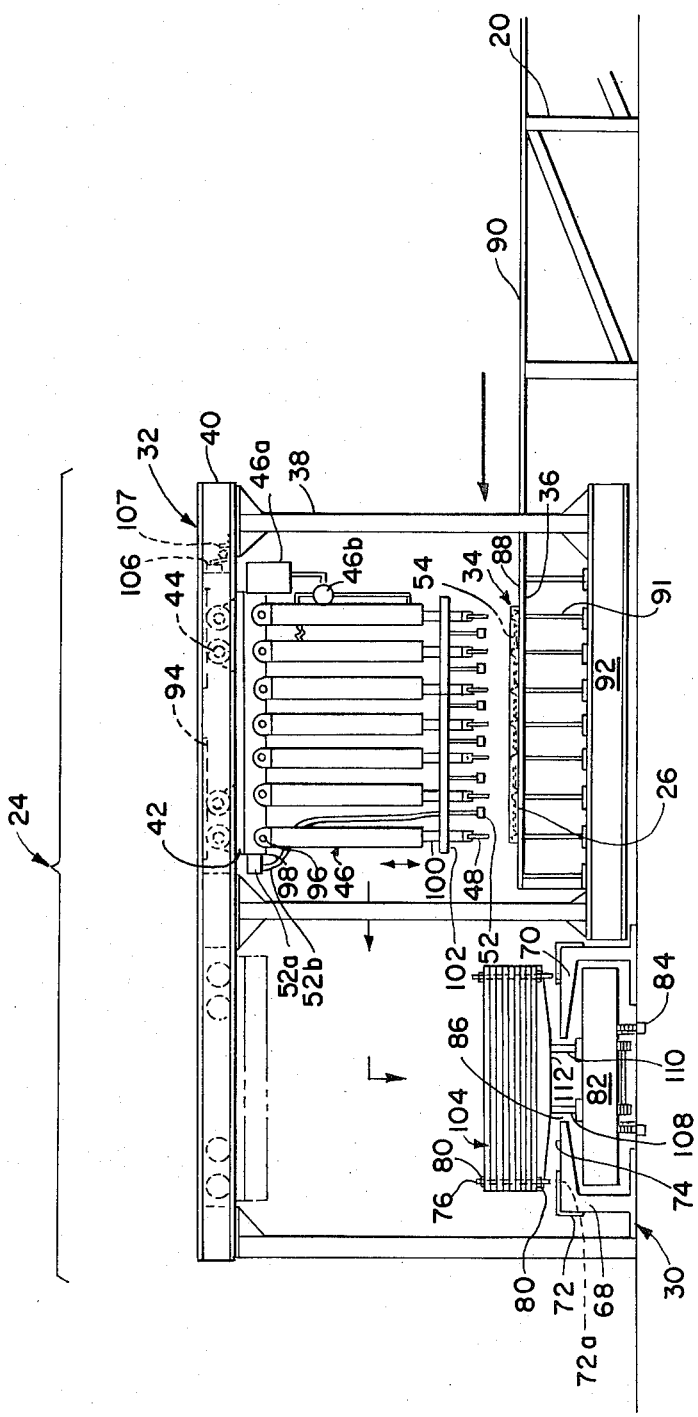
FIG. 2 is an elevation viewed generally from 2—2, FIG. 1.

FIG. 1 and 2 show, in diagrammatical form, details of a preferred embodiment 10 of this invention.

Roll forming machine 12 produces and serially ejects cut-to-length panel-like modules 14 having interlockable edges 16, 18. A run-out table 20 is disposed at right angles to the roll forming machine, and the modules are moved along the table by conveyor belts or other suitable means.

The modules are arranged in groups with successive modules facing alternately up and down and then are loosely assembled in arrays 22 by overlapping the interlockable edges. The arrays of modules are then passed to a fabrication and transfer station 24 where the overlapped edges are pressure-interlocked by a reciprocable unit, are completed by the welding of a split-tube type, hempiece 26, 28 across each end, and are conveyed to a bundle transfer frame 30 by a combination press/welding-clamp/stacker unit 32.

In FIG. 1, combination press/welding-clamp/stacker unit 32 is shown partially roken away to reveal details below, but comprises generally the following described elements, shown at completion of a precipitator plate 34 and before removal of the plate to a stack. Most of these elements can be seen in FIG. 2.

Press table 36 uniformly supports the precipitator plate 34 from beneath. Stanchions 38 support overhead conveyor tracks 40 and 40' parallel with and to the sides of the run-out table and press table, and over the bundle transfer frame 30 at the end of the press table.

Ram carriage 42 has rollers 44 movably mounting it to the overhead tracks 40, 40'. The ram carriage is shown in the press/clamp position above the press table. Hydraulic rams 46, which are synchronized by having a common pressure feed represented by source 46a and reversing valve 46b, depend from the ram carriage in spaced rows adapting clamping blades 48 on the ends of the rams to exert interlocking pressure directly on each joint 50 of the overlapping edges of the work below, when the rams extend. After the joints snap together, the rams maintain pressure on the work, keeping it clamped in flat alignment against the planar press table surface in preparation for welding. At the same time, grippers 52 are energized. The grippers may be magnetic or suction, and of any conventional design. These are fixed to the ram assembly above the work in a manner described later. The grippers remove buckles in the flat areas 54 of the modular array, further aligning it for welding. Finally the hempieces 26 and 28 are attached by resistance welders 56 and 58 (FIG. 1) which are disposed at the sides of the press table 36. The welders are suitably provided with means for travelling from spot to spot along the hempieces during the fastening process, as by being mounted slidably on rails 60 and 62, and are supplied with current from transformers 64 and 66, respectively, in any conventional manner adapting the welders to advance to the work and to retract to the positions shown, as for example by flexible cables 65 and 67.

After the hempieces are welded on, the ram clamping pressure is released but through continued energization, the grippers 52 are caused to continue to hold the finished precipitator plate 34, in preparation for lifting and attaching. Any conventional circuit represented by box 52a and the associated line 52b can be used for operation of the grippers in the synchronism required.

Next the rams 46 are retracted, in unison, lifting the precipitator plate 34, and the ram carriage motor 53 is activated, moving the precipitator plate to a predetermined position over the bundle transfer frame 30 in position for lowering it onto the frame and successively stacking other precipitator plates on it as they are completed. The bundle transfer frame 30 is essentially a table longitudinally divided into spaced-apart halves 68 and 70.

Bundle rod attachment bars 72 affixed on the upper surface 74 of the bundle transfer frame 30 serve to support bolt-like bundle rods 76 detachably in an upright position in holes 72a. Each bundle rod has a nut 80 threaded on the bottom leaving a lower portion of the rod exposed below the nut to slip into hole 72a. Openings 78 in the precipitator plates engage the bundle rods as the plates are lowered by extension of the rams 46 during stacking.

When the stacks are complete, fasteners such as nuts 80 are secured on the tops of the bundle rods, uniting the stacks as bundles.

A shuttle car 82 arranged to pass beneath the bundle transfer frame 30 on tracks 84, self-loads the bundle by elevating spreaders 112 through openings 86 provided in the bundle transfer frame, and conveys the bundle to a storage area where it off-loads the bundle by lowering it onto a second transfer frame generally like the first. The bundle 104 is then picked up by crane and deposited edge-down in storage, as at 104, FIG. 2.

FIG. 2 additionally shows other details of the run-out table 20, the press/welding-clamp/stacker unit 32, and the bundle transfer frame 30 and shuttle car 82 arrangement. The surface 88 of the press table 36 is preferably continuous with the surface 90 of the run-out table 20. The press table surface preferably has local supports 91 under the positions of greatest load, with the local supports resting on a massive sill 92, but may be of any equivalent construction providing a suitably flat, rigid, and strong surface for working precipitator plates 34.

The stanchions 38 at the corners of the press table unite the sill 92 and the overhead conveyor tracks 40 into a strong, rigid box-like frame. The conveyor tracks are heavy channels containing the rollers 44 of the ram carriage, top and bottom. Shim plates 94 are fixed to the upper legs of the channel shape in position over the press table to reduce backlash under thrust of the rams.

The rams 46 are preferably pivotally suspended by stub axles 96 from header flange 98 longitudinally fixed to the ram carriage. Each ram piston 100 has one of the clamping blades 48 fixed at the free end of the piston; the blades are suitably spaced for engaging the joints of the precipitator plates. The ram pistons pass through and are welded to or clamped in an aligning piston-header-plate 102 which also mounts the plate grippers 52 between and in spaced relation to the pistons. The grippers are mounted in-plane and, as noted, apply aligning pressure (upward or downward as needed, by means of the fixed relation and the gripping capability) to the flat areas 54, of the modules during the welding operation.

As indicated by the arrows, on retraction of the rams, the grippers 52 lift the just-completed precipitator plate, the ram carriage is then actuated, moves to the stacking position, and extends the rams, lowering the precipitator plate over the guiding and securing bundle rods 76, and nesting it in the stack.

Pressure-nesting may be employed, as when the stack is complete and nuts 80 are to be applied to secure it as a bundle 104. Following the stacking movement, the grippers are released and the ram carriage retracts and returns to the press table position.

Because high rates of carriage travel can be precisely controlled by conventional means symbolized by limit switch 106 and stop 107, transfer and stacking of the completed work according to the present invention requires little more time, if any, than that necessary to position the succeeding array of modules on the press table.

As shown also in FIG. 2, the bundle transfer frame halves 68 and 70 overhang the sides of the shuttle car 82. The shuttle car jacks are preferably paired as at 108 and 110, with each pair supporting a transverse spreader 112.

FIG. 3 is an end elevation showing a bundle transfer frame 330 having special provisions for upending and pickup of bundles by a crane 343 after the bundles are off-loaded onto the bundle transfer frame by a shuttle car on reversal of the loading procedure.

Bundle transfer frame 330 is similar in construction to bundle transfer frame 30 which was described in reference to FIGS. 1 and 2. However, to prevent bundle skidding during up-ending, a bundle-stabilizing angle 331 having perpendicular legs 333 and 335 is pivoted at the apex by hinge pin 337 along one side of the bundle transfer frame.

The shuttle car in offloading lowers the bundle 104 onto leg 333 which has been oriented in the horizontal, inwardturned direction. A thickness compensating strip 341 affixed along the other side of the bundle transfer plate levels the bundle.

The hook of crane 343 then engages at $C_1$ any conventional pickup fixture 345 which is attached to the off-edge 347 of the bundle by the bundle rods or in any other conventional manner. The hook then simultaneously lifts and advances from right to left in the Figure, passing through intermediate positions such as $C_2$ in which the near edge 349 of the bundle would skid off the table if not restrained. After the bundle is upand-down at $C_3$, it is lifted free, transported, and deposited edge down in storage.

Damage caused by scuffing, bumping, and bending is avoided by the corner-protecting fit and the rotation feature of angle 331. The hook is safely engageable at a low level, and danger to personnel in the remainder of the up-ending operation is minimized. Any desired number of transfer frames of this type can be used to optimize crane usage.

FIG. 4 is an isometric view of a prior invention array of edge interlockable rectangular modules 14 of the general type the present system is adapted to produce and process. The pressure interlockable features is shown at "A", a locked joint, and at "B" a loosely overlapped joint in position for pressure interlocking.

Having thus described the invention in its best embodiment and mode of operation, what is described to be claimed by letters patent is:

1. In a method of assembling and staging for shipment a plurality of precipitator plates or the like, each precipitator plate being an assembly of a plurality of edge-overlapped pressure interlocked modules and a first and second hempiece respectively extending across the first and second ends of the precipitator plate, the improvement comprising the steps:
   a. overlapping the edges of a plurality of said modules;
   b. simultaneously applying pressure to and interlocking all overlapping edges of the plurality of modules;
   c. maintaining the pressure on the modules and gripping and aligning portions of the modules intermediate the overlapping edges;
   d. fastening first and second hempieces respectively across the first and second ends of the plurality of interlocked modules, thereby completing assembly of a precipitator plate;
   e. releasing the interlocking pressure and by means of said gripping lifting the pecipitator plate;
   f. conveying the precipitator plate horizontally to a stacking location;
   g. lowering the precipitator plate to a predetermined level;
   h. releasing the gripping, supporting the precipitator plate from below at the level to which lowered;
   i. repeating steps (a) through (g), resting each successive precipitator plate on the prior assembled precipitator plate, thereby forming a bundle of precipitator plates;
   j. liftingly engaging the bundle of precipitator plates from a position below the bundle of precipitator plates;
   k. horizontally moving the bundle of precipitator plates to an area away from said stacking location; and
   l. offloading the bundle of precipitator plates in said area, thereby assembling and staging for shipment a plurality of precipitator plates.

2. In a method as recited in claim 1, the additional improvement comprising:
   in step (g) guiding the precipitator plate during lowering to the level by reference to at least one position at the level; and
   in step (i) maintaining the guiding and fastening the bundle together by reference to the guiding.

3. In a method as recited in claim 2, the additional improvement comprising:
   in step (l) pivoting the offloaded bundle of precipitator plates about one corner thereof to a vertical position, and depositing the bundle of precipitator plates on edge.

4. In a system for assembling and staging for shipment a plurality of plates, each plate comprising a plurality of modules in edge-interlocked array with first and second end-pieces fixed across the respective first and second ends of the array, the improvement comprising:
   unitary movable means including:
      means extensible for applying pressure to and simultaneously interlocking all overlapping edges of an edge-overlapped array of modules, including
      means energizable for gripping a portion of the array of modules other than the overlapped edges concurrently with said application of pressure, thereby aligning said portion of the array for the attachment of hempieces and the like to form a plate;
      means for retracting the extensible means and causing the energizable means to lift a said plate;

means for conveying said gripped plate for stacking by the extensible means and the energizable means;
   means for lowering a said plate conveyed for stacking, including means for re-extending the extensible means and means for de-energizing the energizable means;
   means cooperative with the unitary movable means, for receiving and aligning the plate for stacking including means for uniting a plurality of stacked plates as a bundle;

means for raising said bundle from the receiving means and for transporting the bundle away from the receiving means;

means for offloading a said bundle from the raising and transporting means, and means for rotating a said bundle and depositing in on-edge for storage.

5. In a system as recited in claim 4, wherein the system includes a table, wherein the means extensible includes:

a vertically reciprocable ram system positionable over the table;

a plurality of laterally spaced clamping blades responsively attached to the ram system;

a plurality of plate grippers comprising said means energizable, said plurality of plate grippers attached to the to the ram system in spaced relation to the clamping blades;

and wherein the means for conveying includes a carriage arranged for moving the ram system to a stacking location.

6. In a system as recited in claim 5, and additionally means for attachment of hempieces to modular arrays, comprising:

first and second ways parallel with and respectively positioned at first and second sides of the table;

a movable mounting on each way;

and a fastener supported by each movable mounting, thereby adapting the fasteners for movement parallel with said sides of the table.

7. In a system as recited in claim 5, the means for receiving and aligning plates comprising:

a base;

a plurality of holders proximate the base, and a plurality of vertically elongate members removably held by said holders in position for engaging plates during stacking.

8. In a system as recited in claim 7, the means for uniting stacked plates as a bundle comprising at least one member adapted for securing the upper end of one of said vertically elongate members.

9. In a system as recited in claim 7, the means for raising from below and transporting a bundle away from the receiving means comprising:

a shuttle car, and a jacking system on the shuttle car arranged for raising and lowering a said bundle.

10. In a system as recited in claim 9, the means for offloading comprising:

a transfer frame having an opening arranged for receiving said shuttle car and having a surface at a level to receive a bundle lowered by said shuttle car jacking system.

11. In a system as recited in claim 10, the means for rotating and depositing a said bundle on edge including:

a stabilizer having a pair of legs fixed at an angle to each other;

a pivot securing the stabilizer to the transfer frame in position for receiving in the angle between the legs thereof a corner of a bundle lowered by the shuttle car;

and a hoist movably arranged above the transfer frame in position for rotating to a vertical position a bundle having a corner stabilized in said angle and for depositing a said bundle for storage in an edge of the bundle.

* * * * *